(12) United States Patent
Noguchi

(10) Patent No.: US 9,064,524 B2
(45) Date of Patent: Jun. 23, 2015

(54) PLAYBACK APPARATUS AND PLAYBACK CONTROL MEANS

(75) Inventor: Shuichi Noguchi, Kanagawa (JP)

(73) Assignee: Sony Corporation, Tokyo (JP)

(*) Notice: Subject to any disclaimer, the term of this patent is extended or adjusted under 35 U.S.C. 154(b) by 1554 days.

(21) Appl. No.: 12/006,384

(22) Filed: Jan. 2, 2008

(65) Prior Publication Data

US 2008/0298770 A1 Dec. 4, 2008

(30) Foreign Application Priority Data

Jan. 5, 2007 (JP) ................. P2007-000830
Dec. 13, 2007 (JP) ................. P2007-321925

(51) Int. Cl.
| | |
|---|---|
| *G11B 15/00* | (2006.01) |
| *G11B 15/02* | (2006.01) |
| *G11B 19/06* | (2006.01) |
| *G11B 27/10* | (2006.01) |
| *G11B 27/11* | (2006.01) |
| *G11B 20/10* | (2006.01) |
| *H04L 12/28* | (2006.01) |

(52) U.S. Cl.
CPC .............. *G11B 15/026* (2013.01); *G11B 19/06* (2013.01); *G11B 27/105* (2013.01); *G11B 27/11* (2013.01); *G11B 2020/10546* (2013.01); *G11B 2220/2537* (2013.01); *H04L 2012/2849* (2013.01)

(58) Field of Classification Search
CPC .... G11B 15/0026; G11B 15/00; G11B 19/06; G11B 27/11; G11B 27/105; G11B 2020/10546; G11B 2220/2537; H04L 2012/2849
See application file for complete search history.

(56) References Cited

U.S. PATENT DOCUMENTS

| | | | | |
|---|---|---|---|---|
| 6,151,278 | A * | 11/2000 | Najarian | 368/12 |
| 6,502,194 | B1 * | 12/2002 | Berman et al. | 726/28 |
| 6,728,729 | B1 * | 4/2004 | Jawa et al. | 1/1 |
| 7,159,234 | B1 * | 1/2007 | Murphy et al. | 725/87 |
| 7,183,908 | B2 * | 2/2007 | Jyrinki | 340/539.1 |
| 7,899,390 | B1 * | 3/2011 | Littlejohn et al. | 455/3.02 |
| 2008/0162716 | A1 | 7/2008 | Kayanuma et al. | |

FOREIGN PATENT DOCUMENTS

| | | |
|---|---|---|
| JP | 62-156339 U | 10/1987 |
| JP | 06-138263 A | 5/1994 |
| JP | 08-007550 A | 1/1996 |

(Continued)

OTHER PUBLICATIONS

Wisegeek, "What Is Non-Volatile Memory?" Jan. 6, 2006. Paragarphs 1-6.*

*Primary Examiner* — Shewaye Gelagay
*Assistant Examiner* — Kendall Dolly
(74) *Attorney, Agent, or Firm* — Wolf, Greenfield & Sacks, P.C.

(57) ABSTRACT

A playback apparatus adapted to play back a content includes a first input unit via which to input a first content to be played back from a first apparatus, a second input unit via which to input a second content to be played back, and a storage unit adapted to store a specified playback start time. If time measured by a clock unit indicates that a predetermined time before the specified playback start time has been reached, a control unit controls a requesting unit to request the first apparatus to input the first content to be played back. If it is determined that the inputting of the first content from the first apparatus is not successfully completed by the specified playback start time, the control unit controls the playback operation so as to play back the second content input via the second content input unit.

26 Claims, 9 Drawing Sheets

(56) References Cited

FOREIGN PATENT DOCUMENTS

| JP | 09-182028 | A | | 11/1997 |
|---|---|---|---|---|
| JP | 10-228715 | A | | 8/1998 |
| JP | 2003-330623 | A | | 11/2003 |
| JP | 2003-333501 | A | | 11/2003 |
| JP | 2006-004582 | A | | 1/2006 |
| JP | 2006-018991 | A | | 1/2006 |
| JP | 2006-221723 | A | | 8/2006 |
| JP | 2006221723 | A | * | 8/2006 |

* cited by examiner

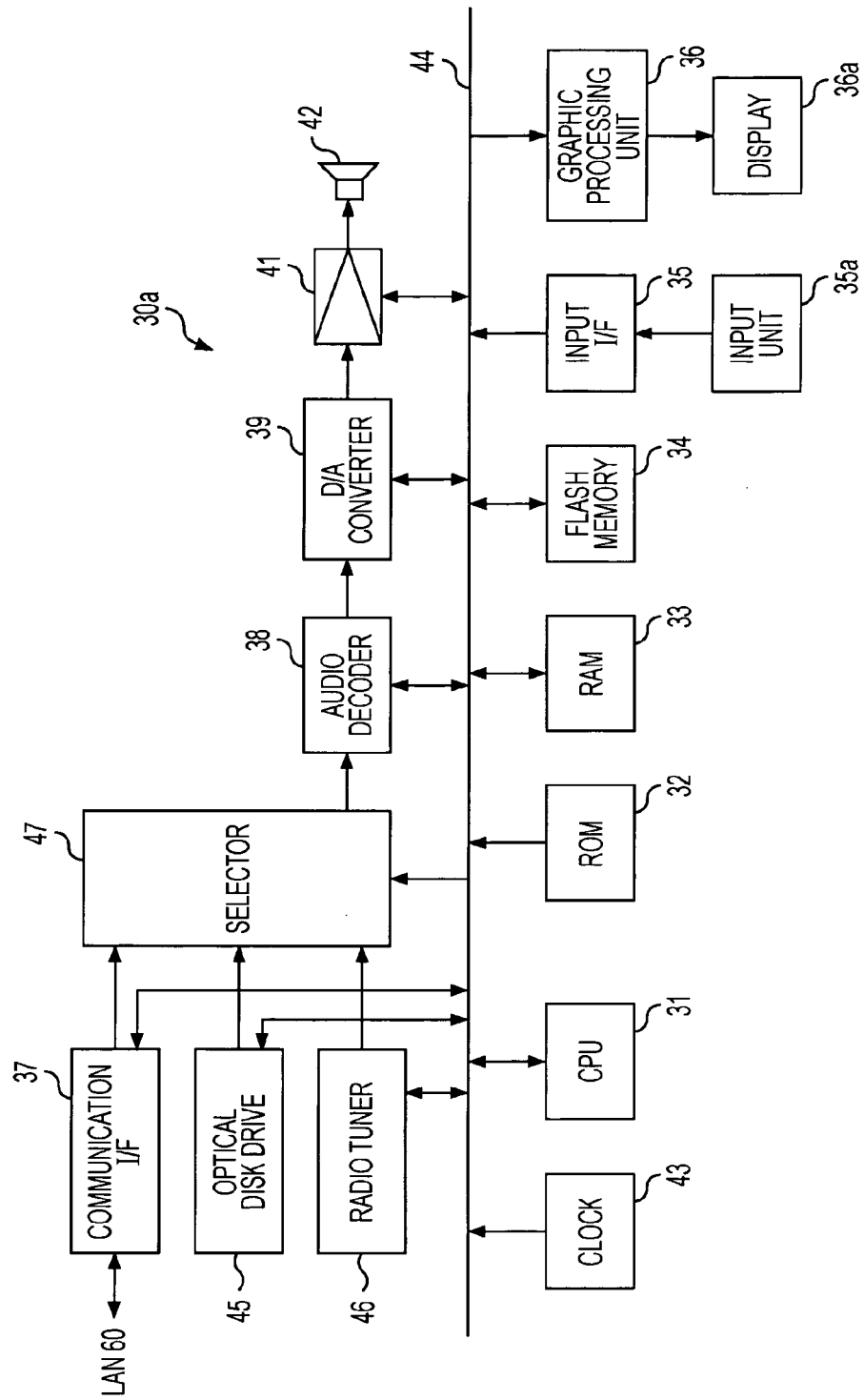

PLAYBACK APPARATUS AND PLAYBACK CONTROL MEANS

CROSS REFERENCES TO RELATED APPLICATIONS

The present invention contains subject matter related to, and the present application claims priority to Japanese Patent Application JP 2007-000830 filed in the Japanese Patent Office on Jan. 5, 2007, and Japanese Patent Application JP 2007-321925 filed in the Japanese Patent Office on Dec. 13, 2007, the entire contents of which are incorporated herein by reference.

BACKGROUND OF THE INVENTION

1. Field of the Invention

The present invention relates to a playback apparatus adapted to play back a content and a method of controlling a playback operation, and more particularly, to a playback apparatus having a capability of playing a content in a timer-controlled playback mode, and a method of controlling a playback operation such a playback apparatus.

2. Description of the Related Art

Audio/video contents are widely used in the form of digital data, and various apparatus for easily recording/playing digital data of audio/video contents are available. It is also very popular to play back a content read from a storage medium or a content received from a server via the Internet.

It is also popular to build a home network system using a LAN (Local Area Network) or a wireless LAN. Thus, it is desirable to provide a technique to easily transmit digital contents between devices in a home network system. In view of the above, efforts of establishing standards for procedures of connection between devices and control of contents are under way. One of such standards is UPnP (Universal Plug & Play) proposed by Microsoft Co., Ltd. of USA. The DLNA (Digital Living Network Alliance) guideline has been established based on the UPnP standard, and efforts of developing various devices according to the DLNA guideline are under way.

Some playback apparatuses have a capability of playing a content in a timer-controlled playback mode such that when a specified playback start time comes, the playback apparatus automatically wakes up from a sleep state and starts playback of the content. The time-controlled playback capability is often used as an alarm clock. For this purpose, it is desirable that the playback operation starts at the specified time in a highly reliable manner. However, the playback operation does not necessarily starts at the specified time. For example, if a storage medium in which the specified content is stored is not mounted on the playback apparatus by mistake, the playback operation does not start at the specified time.

In particular, in a case where a content received from a server via a network is played back, a rather long time is needed to assign network addresses and connect the playback apparatus to the server via the network, and thus the playback operation does not necessarily start at the specified time. Besides, there is a possibility that the server from which to receive the content is not in a normal operation when the specified playback start time has come. In this case, the playback operation does not start.

One technique to play back a content at a specified time is to monitor elapsed time and, if arrival of the specified time is detected during playback of a content stored on an optical disk, stop the playback in a normal playback mode and output an alarm sound (see, for example, Japanese Unexamined Patent Application Publication No. 2002-56659 (paragraphs to [0125], FIG. 15)).

One technique to start up an apparatus is to automatically start up the apparatus by using an automatic power-on circuit installed in a miniPC (Peripheral Components Interconnect) card mounted on the apparatus (see, for example, PCT Japanese Translation Patent Publication No. 02-073384 (page 8, FIG. 2)). In some systems, a data processing node monitors a signal on a network when the data processing node is in a sleep state. If the data processing node detects an AWAKE command, the data processing node starts awaking of a network controller (see, for example, Japanese Patent No. 3429806 (paragraphs to [0022], FIG. 2)).

In some communication system, when a client apparatus issues a request for service to a server being in a standby mode, an occurrence of a time-out is monitored on the basis of a start-up time estimated in advance (see, for example, Japanese Unexamined Patent Application Publication No. 2005-222101 (paragraphs to [0039], FIG. 5)).

SUMMARY OF THE INVENTION

As described above, there is a need for a playback apparatus capable of playing back a content at a specified time in a timer-controlled playback mode in a highly reliable manner. In particular, there is a need for a high-reliability DLNA playback apparatus capable of starting playback of a content received via a network at a specified playback start time thereby achieving an alarm clock function on the playback apparatus.

According to an embodiment of the present invention, in view of the above, there is provided a playback apparatus adapted to play back a content, comprising first content accepting means for accepting input of a content to be played back in a timer-controlled playback mode, second content accepting means for accepting input of an auxiliary content, clock means for measuring time to detect arrival of a specified time at which to start playback of the content in the timer-controlled playback mode, and playback control means for controlling the playback operation such that when the time measured by the clock means indicates arrival of a playback reparation start time a predetermined time before the specified playback start time, a playback preparation process for making preparation for playback, in the timer-controlled playback mode, of the content accepted via the first content accepting means is started, and, if the playback preparation process is not successfully completed by the specified playback start time, playback of the auxiliary content accepted via the second content accepting means is started.

In this playback apparatus, at the playback reparation start time the predetermined time before the specified playback start time, the playback control means starts the playback of the content specified to be played back in the timer-controlled playback mode. In the case where the playback preparation process for preparation for the playback of the content to be played back in the timer-controlled playback mode is not successfully completed by the specified playback start time, the playback control means starts the playback of the auxiliary content accepted via the second content accepting means.

BRIEF DESCRIPTION OF THE DRAWINGS

FIG. 10 is a block diagram illustrating an example of a hardware configuration of an audio playback apparatus according to an embodiment of the present invention.

DESCRIPTION OF THE PREFERRED EMBODIMENTS

The present invention is described in further detail below with reference to embodiments in conjunction with the accompanying drawings. In the following explanation, by way of example, it is assumed that content data played by a playback apparatus is audio data.

First Embodiment

Figure 1:
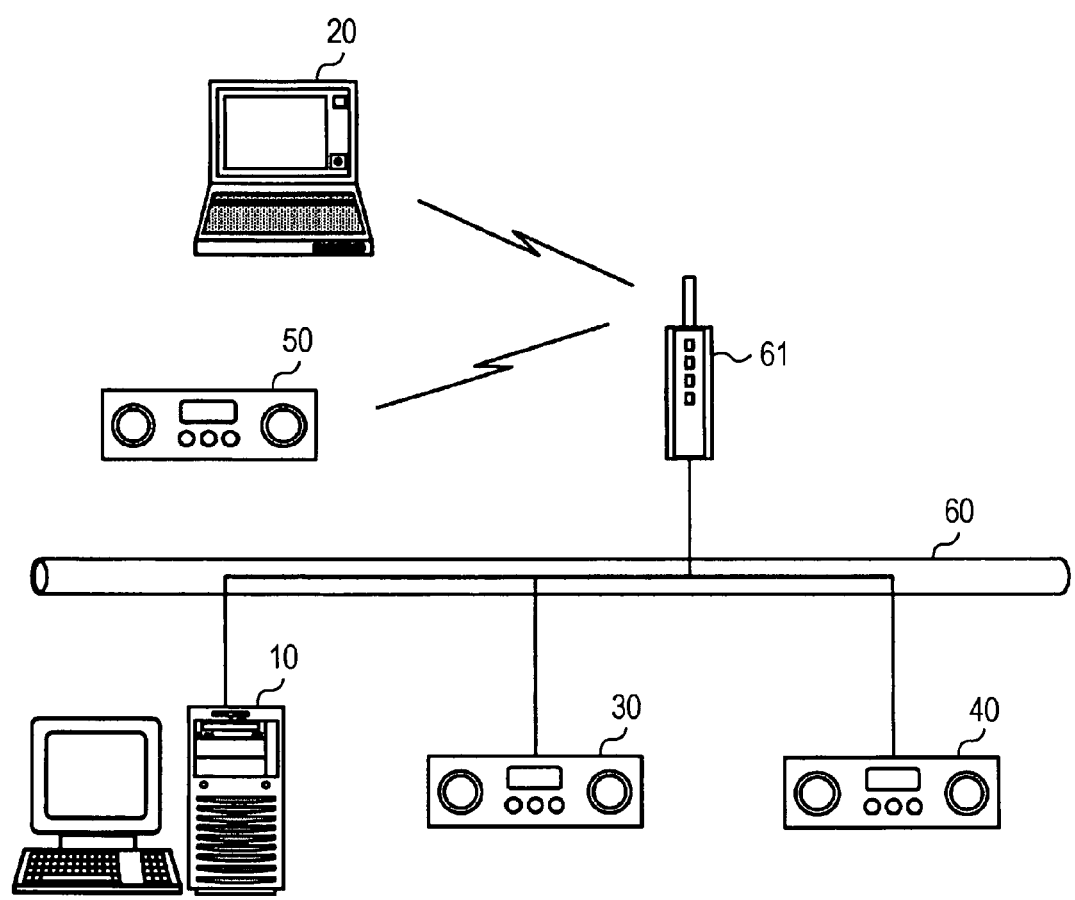
FIG. 1 is a diagram illustrating an example of a home network system according to an embodiment of the present invention.

FIG. 1 illustrates an example of a configuration of a home network system according to an embodiment of the present invention.

In the following explanation, it is assumed, by way of example, that the present invention is applied to a LAN system (home network system) built in a home. As shown in FIG. 1, the home network system includes servers 10 and 20 and audio playback apparatuses 30, 40, and 50, which are connected to each other via a LAN 60. The server 20 and the audio playback apparatus 50 are wireless-connected to the LAN 60 via a wireless LAN access point 61, while the server 10 and the audio playback apparatuses 30 and 40 are cable-connected to the LAN 60.

In practice, for example, the access point 61 is integrated with a broadband router, and the server 10 and the audio playback apparatuses 30 and 40 are connected to the broadband router via a LAN cable or a hub thereby building a LAN system including the server 20 and the audio playback apparatus 50 in addition to the server 10 and the audio playback apparatuses 30 and 40. In this case, the broadband router has a function of serving as a DHCP (Dynamic Host Configuration Protocol server for providing service to devices on the LAN 60 and also has a NAT (Network Address Translation) function, thereby allowing the devices on the LAN 60 to share an external communication line (such as a WAN (Wide Area Network)).

In such a home network system, the servers 10 and 20 have a capability of operating as an information providing apparatus for providing audio data, and the audio playback apparatuses 30, 40, and 50 have a capability of operating as a client apparatus (information playback apparatus) for playing back audio data provided by the server 10 or 20, whereby users are allowed to enjoy listening to various audio contents provided by the server 10 or 20 using audio playback apparatuses 30, 40, and 50. That is, each of the audio playback apparatuses 30, 40, and 50 is capable of selecting one of the servers 10 and 20 as an audio data server depending on the audio data (audio content) to be played back.

Furthermore, in the present embodiment, the audio playback apparatuses 30, 40, and 50 are configured to be capable of easily transmitting/receiving content data to/from electronic devices in accordance with the DLNA guide line. The DLNA guide line recommends that detection and control of an electronic device and management of content data should be performed in accordance with the UPnP standard proposed by Microsoft Co., Ltd. of USA.

The UPnP standard is designed to extend functions of standard Internet communication (TCP/IP communication) and the UPnP standard defines data formats and a set of protocols based on IP (Internet Protocol), TCP (Transmission Control Protocol), UDP (User Datagram Protocol), etc., for use on networks according to the IEEE (Institute of Electrical and Electronic Engineers) 802 standard which is widely used as a standard for network communication using 10/100BASE-T Ethernet (trademark).

By applying the UPnP to a CE (Consumer Electronics) device such as an audio playback apparatus, it becomes possible for the CE device such as an audio playback apparatus to easily perform mutual authentication with another CE device or personal computer and to provide or receive service via a network without users having to perform a complicated operation.

Overview of UPnP

Figure 2:
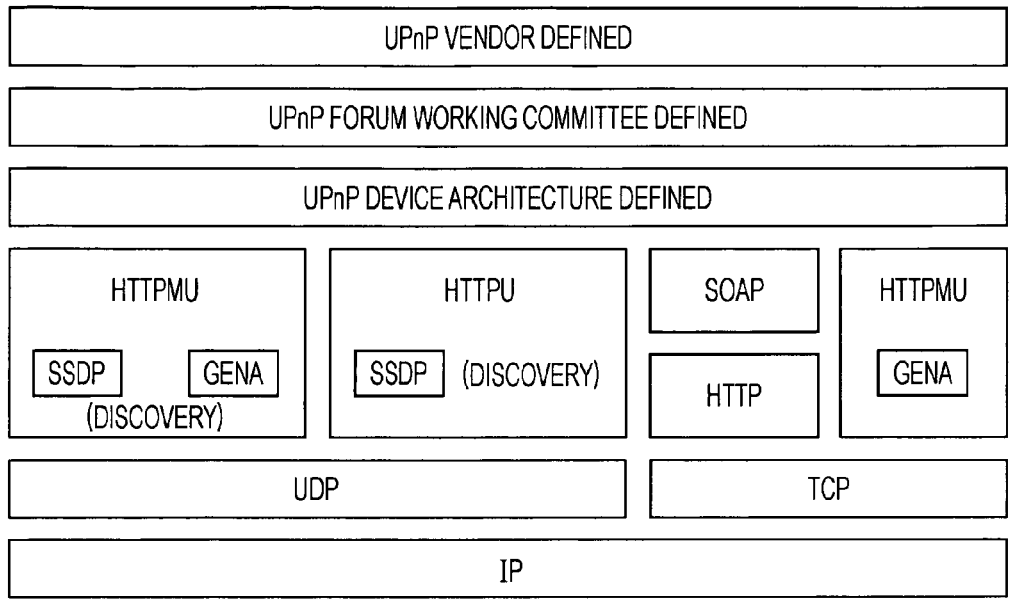
FIG. 2 is a diagram illustrating a UPnP protocol stack.

FIG. 2 is a diagram illustrating a UPnP protocol stack.

As shown in FIG. 2, in UPnP, actual transmission/reception of data is performed in accordance with the standard Internet protocol (IP), and functions specific to UPnP are realized using SSDP (Simple Service Discovery Protocol), GENA (General Event Notification Architecture), SOAP (Simple Object Access Protocol), HTTP (HyperText Transfer Protocol), etc.

Furthermore, as shown in FIG. 2, UPnP may include UPnP Vendor Defined protocols, UPnP Forum Working Committee Defined protocols, and UPnP Device Architecture Defined protocols.

The UPnP provides the following six functions: addressing, discovery, description, control, eventing, and presentation. These six functions provided by the UPnP are described below.

In a case of an electronic device such as an audio playback apparatus configured to operate according to the UPnP standard (hereinafter, such an electronic device will be referred to simply as a UPnP device), to use UPnP functions, audio data is handled in accordance with a UPnP AV architecture. The UPnP devices based on the UPnP AV architecture are classified into the following three types.

In the UPnP AV architecture, UPnP devices are classified into three groups: media servers for providing contents, control points serving as control terminal devices, and media renderers serving as playback apparatuses. The media server corresponds to an apparatus generally called a server in network systems. The media renderer corresponds to an apparatus generally called a client in network systems.

The control point (control terminal device) is a device adapted to control a UPnP device connected to a network. A control point may be installed in a media server or a media renderer, and a control point may be installed in some or all of electronic devices existing on a network. In the present embodiment, it is assumed, by way of example, that a control point is implemented in all of audio playback apparatuses 30, 40, and 50.

Addressing provided by UPnP is a function for each UPnP device to acquire an IEEE802 network address of the UPnP device. In the addressing, DHCP or Auto-IP is used as a protocol.

Discovery is performed after addressing, by a control point to find a target device (a media server or a media renderer) to be controlled. In the discovery, SSDP is used as a protocol. When any electronic device in the network system is connected to the IEEE802 network, the electronic device broadcast, over the IEEE802 network, a message indicating units included in the electronic device and services provided by the electronic device. The control point receives the broadcast message and analyzes the message to detect the device type of the electronic device connected to the IEEE802 network.

An SSDP packet output by an electronic device, to be controlled, found by a control point using the discovery function includes a URL (Uniform Resource Locator) described in a device description. The control point can access the URL to acquire further detailed device information of the electronic device from the device description.

The device information provided by the device description includes icon information, a model name, a manufacturer, a product name, and a service description associated with further detailed information about services provided by the device. From the device description or the service description, the control point acquires information as to how to access the target device. The device description and the service description are described in XML (eXtensible Markup Language).

The control functions include two sub functions: action and query. The action is performed in a manner defined by action information included in a service description. By invoking an action, a control point can control a target device. The query is used to extract a value (state variable) of device information from a service description. In the control, a transport protocol called SOAP is used, and the description thereof is performed using XML.

When a value of device information is changed, a message indicating this fact is sent using the eventing from the target device to the control point. In the eventing, a transport protocol called GENA is used, and the eventing is described in XML. The presentation is used to provide control means using a user interface to a user.

The UPnP functions described above allows UPnP devices not only to connect to a network for communication but also to automatically detect other UPnP devices and connect thereto without a user having to perform a complicated operation.

Figure 3:
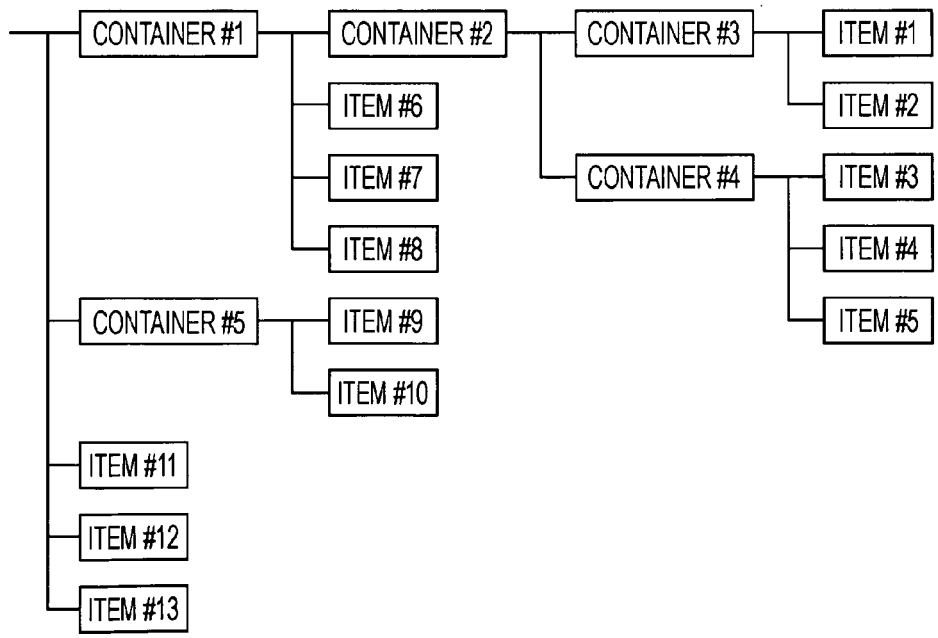
FIG. 3 illustrates an example of a manner in which contents stored in a media server are managed in the form of a tree structure.

FIG. 3 illustrates an example of a manner in which contents stored in a media server are managed in the form of a tree structure.

A media server serving as a UPnP device has a function of CDS (Contents Directory Service) which allows the media server to notify a control point what contents are stored in the media server. The CDS includes two types of abstracted objects called containers and items, corresponding to folders and files in the Windows OS (Operating System) provided by Microsoft Co., Ltd. of USA. Containers and items are managed in the form of a tree structure. In the present embodiment, audio data transmitted from a media server corresponds to an item shown in FIG. 3.

The control point is capable of detecting a URL (a link address) of each content from the tree structure acquired from the media server. If the control point succeeds in acquired a desired audio content (item), the control point is capable of controlling the operation of audio tracks (audio data) including playing and stopping audio contents by using an AV transport function of the media server.

In the present embodiment, the servers 10 and 20 and the audio playback apparatuses 30, 40, and 50 are allowed to connect to each other using the addressing function of UPnP and communicate to each other using TCP/IP. To make a connection, mutual authentication is performed between devices using the discovery function of UPnP. These functions allow the respective devices to detect the network configuration and communicate with a target electronic device.

Configuration of Server

Next, examples of configuration of electronic devices in home network system according to an embodiment of the present invention are described.

Figure 4:
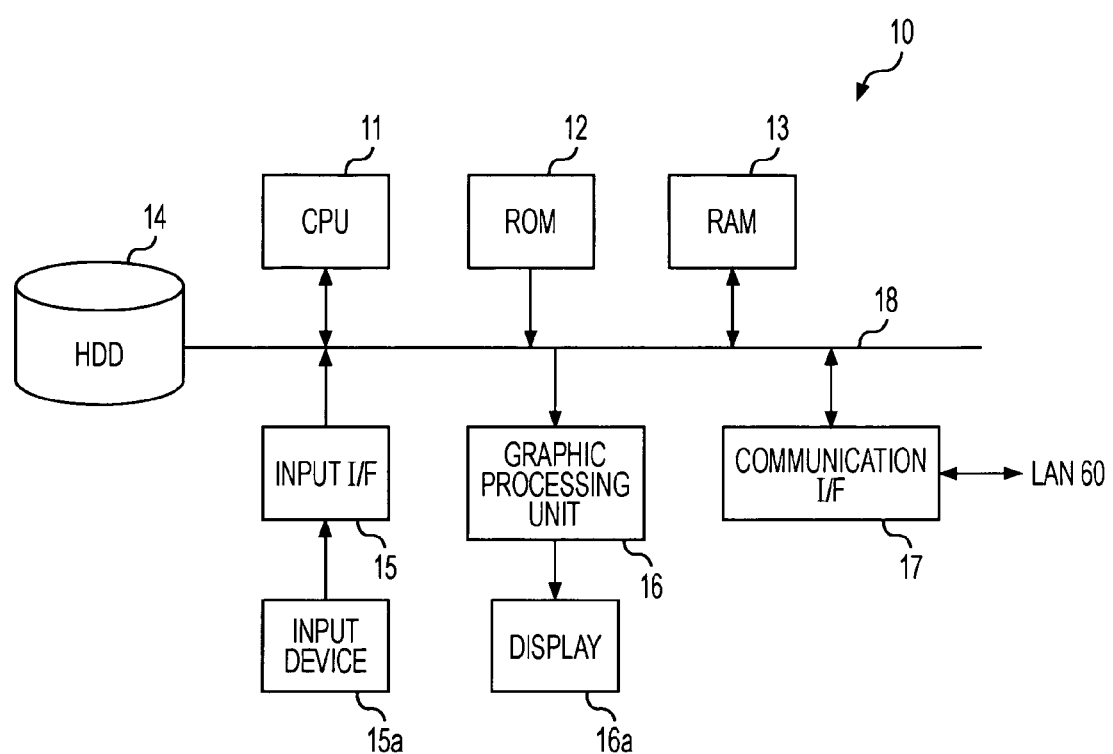
FIG. 4 is a block diagram illustrating an example of a hardware configuration of a server.

FIG. 4 is a block diagram illustrating an example of a hardware configuration of a server. In the following description, by way of example, the hardware configuration of the server 10 is explained, although the server 20 may also be configured in a similar manner.

As shown in FIG. 4, the server 10 includes a CPU (Central Processing Unit) 11, a ROM (Read Only Memory) 12, a RAM (Random Access Memory) 13, an HDD 14, an input interface (I/F) 15, a graphic processing unit 16, and a communication interface (I/F) 17, wherein these parts are connected to each other via internal bus 18.

The CPU 11 is responsible for control over the entire server 10. In the ROM 12, a program executed by the CPU 11 and associated data are stored. The RAM 13 is mainly used a work area in various processes.

The HDD 14 has a storage capacity high enough to store many digital contents (which are provided in response to a request). The HDD 14 is used to store various programs used by the CPU 11 and data used in various processes. The HDD 14 is also used as a work area in various processes such as transmission of a content transcode or a content to a device via the LAN 60.

More specifically, in the present embodiment, in the HDD 14, stored is a server program to be executed by the CPU 11 to allow the device to function as a server for transmitting audio streams to the audio playback apparatuses 30, 40, and 50 according to the DLNA guide line. The functions of the server program may include a transcode function for conversion of the coding method, the sampling rate, the quantization rate, etc. of audio streams stored in the HDD 14.

The input interface 15 is connected to, for example, an input device 15a such as a keyboard and a mouse. The input interface 15 receives a signal output from the input device 15a and transfers the signal to the CPU 11 via the internal bus 18.

To graphic processing unit 16 is connected to, for example, a display 16a such as a LCD (Liquid Crystal Display). The graphic processing unit 16 operates, under the control of CPU 11, so as to display an image on a screen of the display 16a.

The communication interface 17 is connected to the LAN 60 via a LAN cable (not shown) and serves as an interface with other devices in transmission/reception of data. The communication interface 17 has a wake-on-LAN (WOL) function which allows the server 10 to start up such that when the server 10 is in a sleep state, the communication interface 17 monitors a WOL signal transmitted over the LAN 60, and, if a WOL signal addressed to the server 10 is detected, the communication interface 17 controls a power controller (not shown) on a mother board to turn on power to start up the server 10.

Configuration of Audio Playback Apparatus

Figure 5:
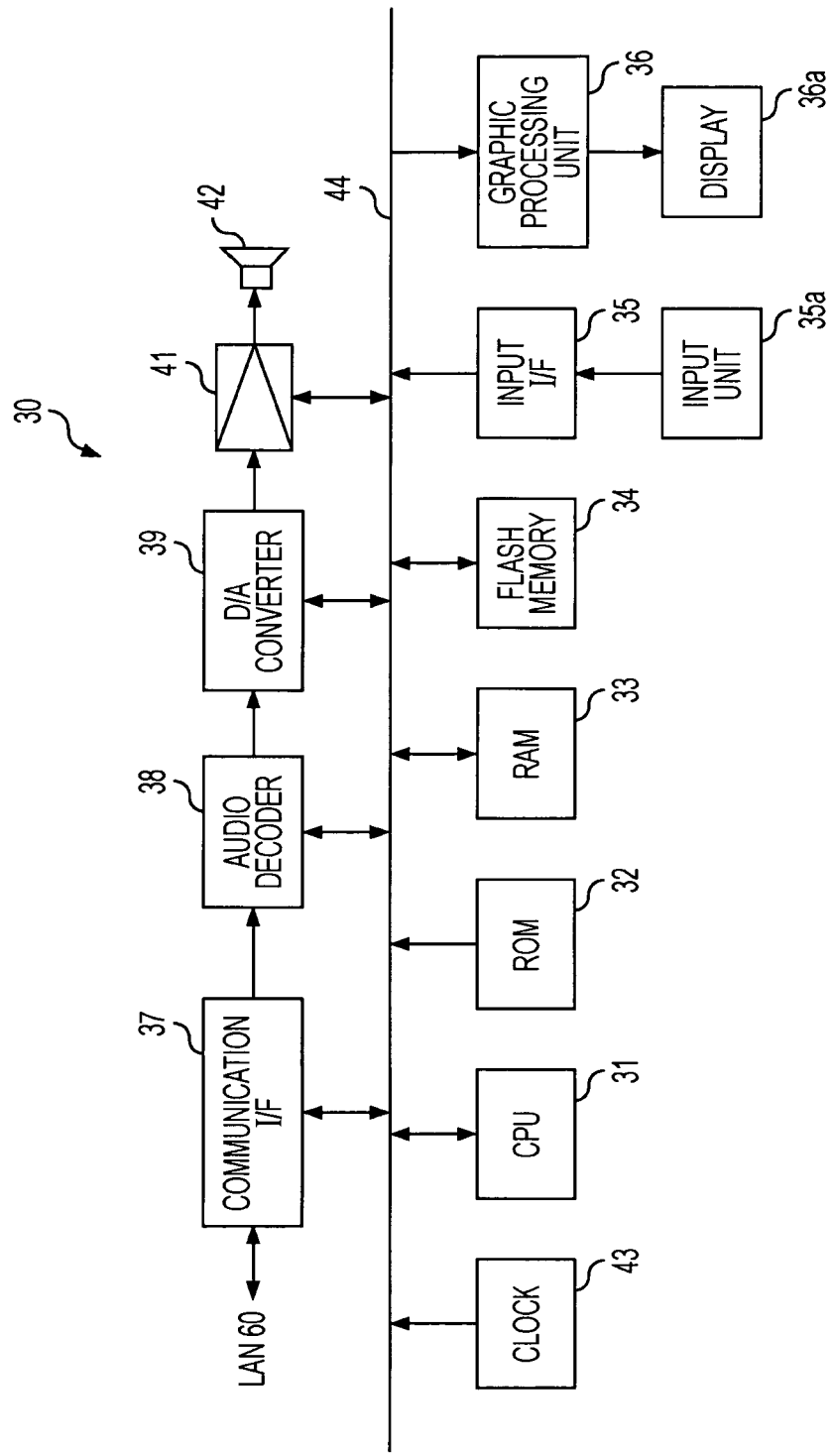
FIG. 5 is a block diagram illustrating an example of a hardware configuration of an audio playback apparatus.

FIG. 5 is a block diagram illustrating an example of a hardware configuration of an audio playback apparatus. In the following explanation, by way of example, the hardware configuration of the audio playback apparatus 30 is explained. Note that the audio playback apparatuses 40 and 50 may also be configured in a similar manner.

As shown in FIG. 5, the audio playback apparatus 30 includes a CPU 31, a ROM 32, a RAM 33, a flash memory 34, an input interface (I/F) 35, an input unit 35a, a graphic processing unit 36, a display 36a, a communication interface (I/F) 37, an audio decoder 38, a digital-to-audio converter 39, an audio amplifier 40, a speaker 412, and a clock 43. These parts, except for the speaker 412, are connected to each other via an internal bus 424.

The CPU 31 is responsible for control over the entire audio playback apparatus 30. In the ROM 32, stored is programs and associated data used by the CPU 31 in execution of various processes. The RAM 33 is mainly used as a work area in various processes. The CPU 31, the ROM 32 and the RAM 33 may be implemented as a whole in the form of a microcomputer.

The flash memory 34 is a writable nonvolatile memory and is used to retain various data even after the power of the audio playback apparatus 30 is turned off. In the present embodiment, the flash memory 34 includes auxiliary audio data stored in advance for use in a situation in which specified audio data cannot be successfully played back at a specified time in the timer-controlled playback mode.

The input interface 35 transfers a signal received from the input unit 35a to the CPU 31 via the internal bus 424. The input unit 35a has various input switches such as operation keys. The graphic processing unit 36 operates under the control of CPU 31 to display an image on a screen of the display 36a. The display 36a may be, for example, a LCD display.

The communication interface 37 is connected to the LAN 60 via a LAN cable (not shown) and serves as an interface with other devices in transmission/reception of data. The communication interface 37 extracts audio stream data from a packet received via the LAN 60 and directly transfers the extracted audio stream data to the audio decoder 38.

The audio decoder 38 is adapted to decode audio stream data received via the communication interface 37 or supplied from the flash memory 34. The audio decoder 38 is adapted to decode audio data in various formats such as a MP3 (Moving Picture Experts Group-Audio Layer 3) format. When audio data in a LPCM (Linear Pulse Code Modulation) format is input, the audio decoder 38 directly output the input audio data to the digital-to-analog converter 39. The functions of the audio decoder 38 may be implemented by software executed by the CPU 31.

The digital-to-analog converter 39 converts the digital audio data supplied from the audio decoder 38 into an analog audio signal. The audio amplifier 401 amplifies the analog audio signal supplied from the digital-to-analog converter 39 to a predetermined level and supplies the amplified analog audio signal to the speaker 412. The speaker 412 outputs a voice/sound according to the supplied analog audio signal.

The clock 43 is adapted to generate time information indicating a reference time for use in a timer-controlled playback operation or the like. Note that the clock 43 operates even in a state in which the audio playback apparatus 30 is sleep state.

Timer-controlled Playback Operation of Audio Data

A timer-controlled playback operation of audio data performed by the audio playback apparatus 30, 40, or 50 is described below. The timer-controlled playback operation refers to an operation of automatically wake up from a sleep state and starting playback of pre-specified audio data at a pre-specified time (hereinafter, referred to as a specified playback start time).

In the following explanation, by way of example, audio data transmitted from the server 10 is received by the audio playback apparatus 30 and played back thereby. Note that the audio playback apparatuses 40 and 50 may also be configured to operate in a similar manner to the audio playback apparatus 30.

Note that the timer-controlled playback operation is also possible for audio content data supplied from the server 20.

Figure 6:
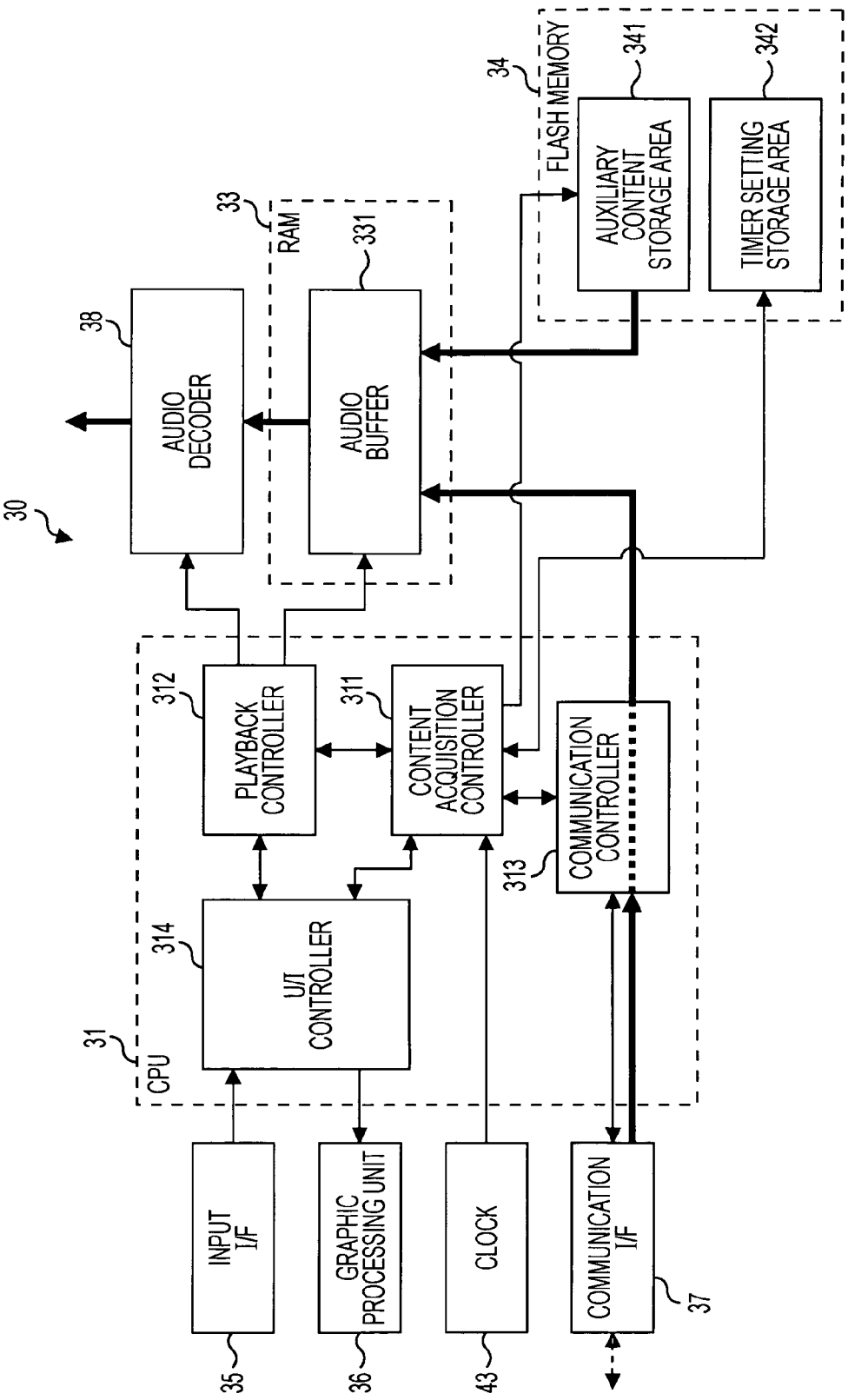
FIG. 6 is a diagram illustrating main functional blocks of an audio playback apparatus.

FIG. 6 is a diagram illustrating main functional blocks of an audio playback apparatus.

In the audio playback apparatus 30, the timer-controlled playback operation is realized by a cooperation of the following units: a content acquisition controller 311, a playback controller 312, a communication controller 313, and a (user interface) (U/I) controller 314. The functions of these units are realized by executing a program on a CPU 31. The audio playback apparatus 30 further includes an audio buffer 331, an auxiliary content storage unit 341, and a timer setting storage unit 342. The audio buffer 331 is formed in a storage area of the RAM 33. The auxiliary content storage unit 341 and the timer setting storage unit 342 are formed in storage areas of the flash memory 34.

The content acquisition controller 311 is a block adapted to control the process of acquiring content data (audio data) to be played back from the server 10. In the content data acquisition process, the content acquisition controller 311 controls the communication controller 313 to search for the server 10, acquire attribute information thereof, and acquire content data. The content acquisition controller 311 also has a capability of controlling the operation in the timer-controlled playback mode on the basis of time information supplied from the clock 43.

The playback controller 312 controls the operation of playing contents by controlling the reading/storing of audio data in/from the audio buffer 331 and the operation of the audio decoder 38.

The communication controller 313 is a block adapted to control the process of communication via the LAN 60. In the present embodiment, the communication controller 313 is adapted to execute a communication procedure or a WOL procedure according to the UPnP standard in accordance with a request issued by the content acquisition controller 311.

The U/I controller 314 detects, via the input I/F 35, an input operation performed on the input unit 35a by a user, and supplies input operation information corresponding to the performed input operation to the content acquisition controller 311 or the playback controller 0312. In accordance with control information supplied from the content acquisition controller 311 or the playback controller 0312, the U/I controller 314 generates display information depending on a situation such as a situation in which a server or a content is to be selected or a situation in which a content is being played, and the U/I controller 314 supplies the generated display information to the graphic processing unit 36. The graphic processing unit 36 displays an image on the display 36a in accordance with the supplied display information.

The audio buffer 331 is a buffer adapted to temporarily store audio data to be played back. In the audio data playback operation, under the control of the playback controller 312, the audio data stored in the audio buffer 331 is sequentially read out and supplied to the audio decoder 38 for decoding.

The auxiliary content storage unit 341 is used to store auxiliary content data (audio data) which is played back instead of a specified content in a state in which the specified content cannot be played back at a specified playback start time in the timer-controlled playback operation. The auxiliary content may be a simple electronic alarm sound or a preselected music content.

The timer setting storage unit 342 is used to store various setting data according to which to perform the timer-controlled playback operation. For example, a specified playback start time, location information (indicating a URL or a port) associated with a content to be played, information (server ID, MAC (Media Access Control) address, etc.) associated with a server from which to receive the content, etc. are stored in the timer setting storage unit 342.

The content to be played in the timer-controlled playback operation may be specified such that audio data played in a normal operation mode by the audio playback apparatus 30 immediately before the time setting operation is automatically specified as the content. In this case, when the audio data is played in the normal operation mode, location information indicating the location of the audio data being played or the information associated with the server is stored in the audio playback apparatus 30, and the information is automatically stored in the timer setting storage unit 342 in response to the execution of the timer setting operation (or at a time at which the power is turned off thereafter).

When the timer setting operation is performed, an arbitrary content may be specified as the content to be played in the timer-controlled playback mode. In this case, a user performs an operation to select a server on a network and a content to be received from the selected server. More specifically, a search message is multicast over the LAN 60, and servers which have returned a response are displayed in the form of a list on the display 36a. Then the server selected by the user is accessed to acquire information indicating the tree structure of contents and associated attribute information thereof.

In a case where items corresponding to music contents are managed in units of albums, a list of album title is displayed on the display 36a. If a user selects an album from the list, then information about a lower layer in which objects of the album are located is acquired, and a list of music titles located in the lower layer is displayed on the display 36a. If the user selects one of the music titles, further detailed attribute information of the item corresponding to the selected music title is acquired. The various kinds of information acquired in the above process are stored in the timer setting storage unit 342.

Figure 7:
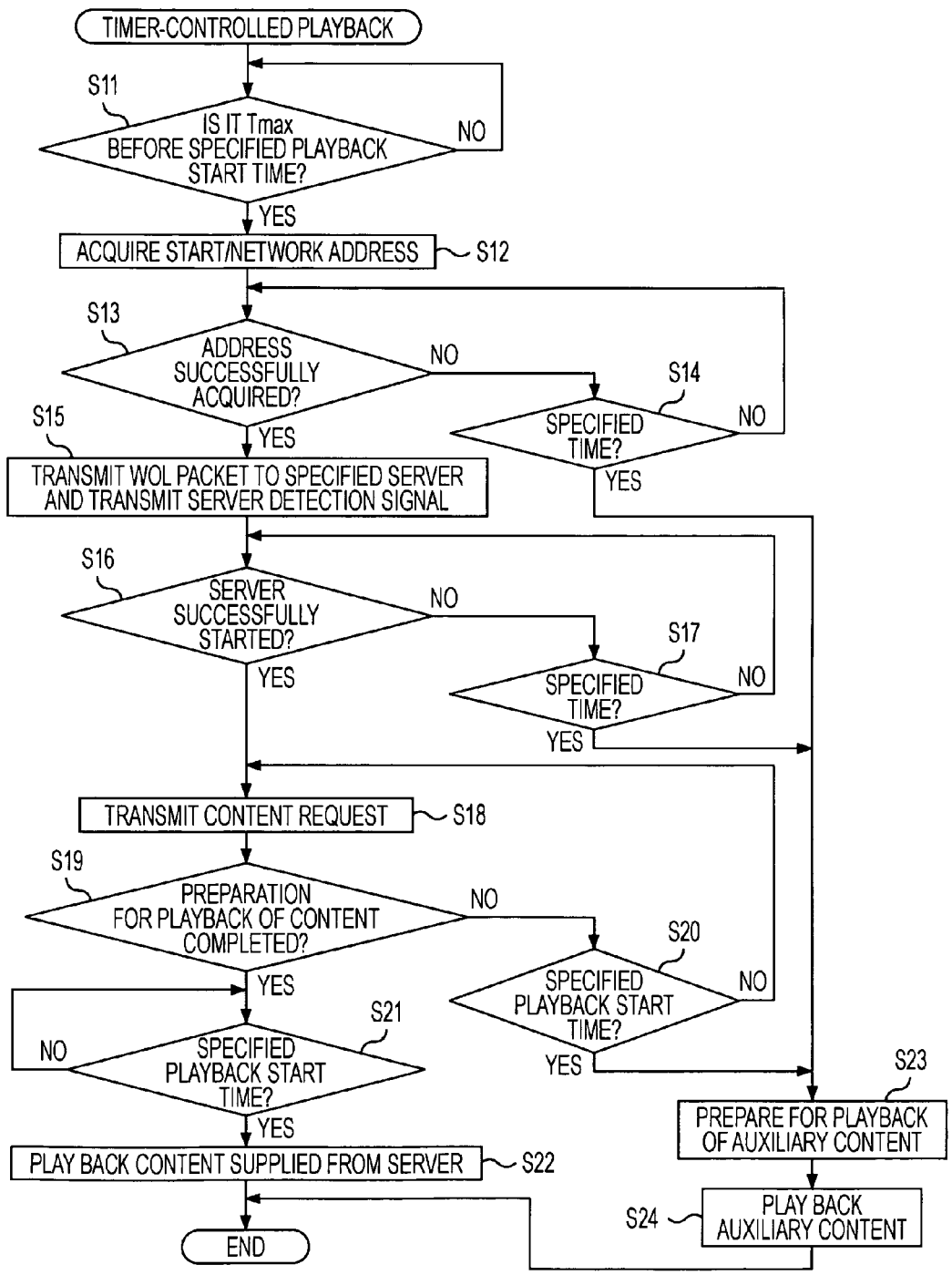
FIG. 7 is a flow chart illustrating a process performed by an audio playback apparatus in a timer-controlled playback mode.

FIG. 7 is a flow chart illustrating a process performed by the audio playback apparatus in the timer-controlled playback mode.

In step S11, in an initial state in which the audio playback apparatus 30 is in a sleep state, time information generated by the clock 43 is monitored by a time monitoring function (not shown) to detect whether it is Tmax before the specified playback start time. If it is determined that it is Tmax before the specified playback start time, step S12 is performed.

In step S12, the time monitoring function outputs a control signal to activate the audio playback apparatus 30. If the audio playback apparatus 30 is activated, the communication controller 313 acquires a network address defined on the LAN 60 and assigned to the communication controller 313. The network address is assigned, for example, by a DHCP server on the LAN 60 when the DHCP detects that the audio playback apparatus 30 is activated.

In step S13, the content acquisition controller 311 determines whether the communication controller 313 has successfully acquired the network address. If the acquisition of the address fails, the processing flow proceeds to step S14. On the other hand, the address has been successfully acquired, the processing flow proceeds to step S15.

In step S14, the content acquisition controller 311 checks the time information output by the clock 43 to determine whether a preset time has come. If the preset time has not yet come, the determination process in step S13 is repeated. On the other hand, if it is determined that the preset time has come, it is determined that a timeout has occurred, and the processing flow proceeds to step S23.

Note that the time whose arrival is checked in step S14 may be set to an arbitrary time before the specified playback start time. Preferably, this time is set to be as long before the specified playback start time as needed to make preparations for starting playback of the specified content after the network address is acquired.

The above-described process from steps S11 to S14 is performed when the audio playback apparatus 30 is in the sleep state. In a case where the audio playback apparatus 30 in an active state, the process may be started from step S15.

In step S15, the content acquisition controller 311 accesses the timer setting storage unit 342 to read the MAC address of the server (the server 10 in this specific case). The content acquisition controller 311 transfers the MAC address to the communication controller 313 and requests the communication controller 313 to activate the server 10. In response to the request, the communication controller 313 broadcasts a WOL packet via the communication interface 37 to activate the server 10.

Furthermore, in accordance with a command issued by the content acquisition controller 311, the communication controller 313 multicasts a detection signal via the communication interface 37 to detect the server.

In step S16, the communication controller 313 waits for arrival of a response to the process in step S15, returned from the server 10. The content acquisition controller 311 determines whether the server 10 has been successfully activated by determining whether the communication controller 313 has received the response. The determination process in this step will be further described in more detail later with reference to FIG. 8. If it is determined that the server 10 has been successfully activated, the processing flow proceeds to step S18, but otherwise the processing flow proceeds to step S17.

In step S17, the content acquisition controller 311 checks the time information output by the clock 43 to determine whether a preset time has come. If the preset time has not yet come, the determination process in step S16 is repeated. On the other hand, if the preset time has already been reached, it is determined that a timeout has occurred, and the processing flow proceeds to step S23.

Note that the time whose arrival is checked in step S17 may be set to an arbitrary time before the specified playback start time. Preferably, this time is set to be as long before the specified playback start time as needed to make preparations for starting playback of the specified content after the activation of the server 10 is detected.

In step S18, the content acquisition controller 311 accesses the timer setting storage unit 342 to read location information indicating the location of the content to acquire. The content acquisition controller 311 transfers the location information to the communication controller 313 and requests the communication controller 313 to acquire the specified content. The communication controller 313 accesses the specified location via the communication interface 37.

In step S19, the content acquisition controller 311 determines whether the preparation for playback of the specified content is completed. If the preparation for playback is completed, the processing flow proceeds to step S21, but otherwise the processing flow proceeds to step S20.

In this step S19, the affirmative determination is made as to whether the preparation for playback is completed, if transmission of corresponding audio data from the server 10 was started in response to the process in step S18, and as much audio data as needed to start the playback has been stored in the audio buffer 331.

Alternatively, the transmission rate of the audio data from the server 10 may be detected, and the negative determination may be made as to whether the preparation for playback is completed, if the transmission rate is lower than a predetermined threshold.

In step S20, the content acquisition controller 311 checks the time information output by the clock 43 to determine whether the specified playback start time has come. If the specified playback start time has not yet come, the determination process in step S18 is repeated. On the other hand, if it is determined that the preset time has come, it is determined that a timeout has occurred, and the processing flow proceeds to step S23.

In step S21, the content acquisition controller 311 checks the time information output by the clock 43 to determine whether the specified playback start time has come. If the specified playback start time has been reached, the processing flow proceeds to step S22. In a period before the specified playback start time has come, the audio data received from the server 10 may be sequentially stored in the audio buffer 331. However, in this case, the reading of the audio data from the audio buffer 331 is not started, but the audio data is retained in the audio buffer 331.

In step S22, the content acquisition controller 311 requests the playback controller 312 to start the playback of the specified content. The playback controller 312 sequentially supplies the audio data stored in the audio buffer 331 to the audio decoder 38 and controls the audio decoder 38 to decode the audio data.

In step S23, the content acquisition controller 311 sequentially supplies the auxiliary content stored in the auxiliary content storage unit 341 to the audio buffer 331, and starts preparation for playback of the auxiliary content.

In step S24, if a predetermined amount of audio data has been stored in the audio buffer 331, the content acquisition controller 311 requests the playback controller 312 to start playback of the audio data. Thus, playback of the auxiliary content is started.

In the process described above, if the playback of the specified content cannot be started at the specified playback start time, or if it is determined during the process that it will not possible to start the playback operation, the auxiliary content stored in advance in the audio playback apparatus 30 is automatically played at the specified playback start time. This prevents the audio playback apparatus 30 from outputting nothing at the specified playback start time, and thus the timer-controlled playback operation provides a high-reliability alarm function.

Communication performed in the above-described process between the audio playback apparatus 30 and the server 10 is described in further detail below.

Figure 8:
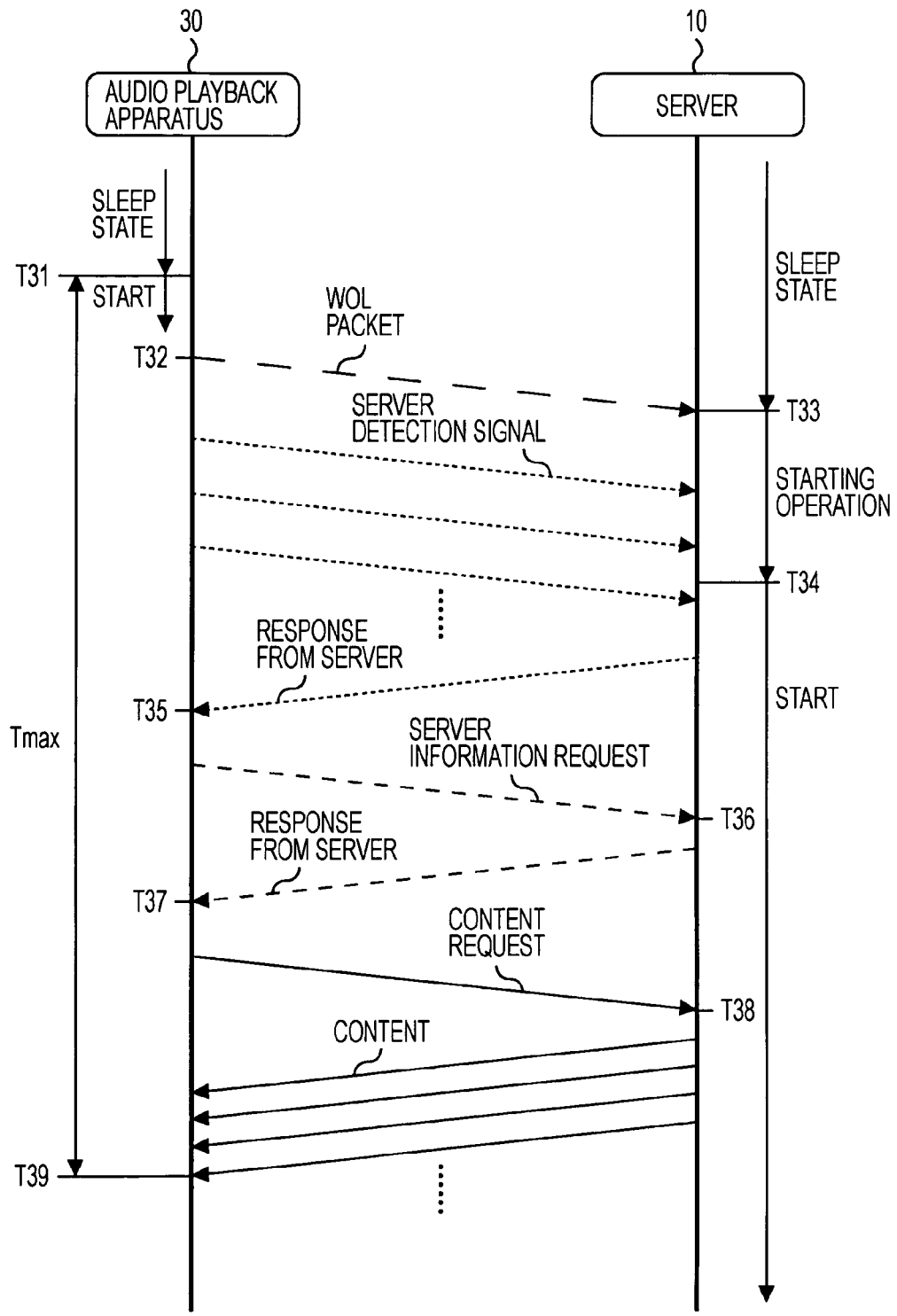
FIG. 8 is a sequence diagram illustrating a communication procedure performed in a timer-controlled playback operation.

FIG. 8 is a sequence diagram illustrating a communication procedure performed in the timer-controlled playback operation.

At first, at time T31, the audio playback apparatus 30 starts the start-up process. If the start-up process is completed, and the network address has been acquired, then, at time T32, the audio playback apparatus 30 specifies the MAC address of the server 10 and broadcasts a WOL packet over the LAN 60. Thereafter, the audio playback apparatus 30 multicasts a server detection signal at predetermined regular intervals until a response from the server 10 is received. Note that the server detection signal is a server search message defined in the discovery function of UPnP.

When the server 10 is in the sleep state, the server 10 monitors an arrival of a WOL packet on the LAN 60. If the server 10 receives, at time T33, a WOL packet with the MAC address of the server 10, the server 10 automatically starts the start-up process. At time T34, if the start-up process is completed, and if the server 10 detects a server detection signal transmitted from the audio playback apparatus 30, the server 10 returns a response signal to the audio playback apparatus 30. The response signal includes ID information identifying the server 10, a URL at which a device description is located, etc. Alternatively, a server connection notification may be returned as the response signal.

At time T35, if the audio playback apparatus 30 receives the response from the server 10, the audio playback apparatus 30 sends a server information request to server 10. More specifically, the audio playback apparatus 30 accesses the URL described in the response from the server 10 to get the device description using the GET command. Furthermore, in accordance with the received device description, the audio playback apparatus 30 issues a request, using the CDS function, for transmission of information about the hierarchical structure in which contents are stored in the server 10. In the request for information using the CDS function, providing of information about the hierarchical structure may be requested on the basis of the information stored in the timer setting storage unit 342.

At time T36, the server 10 returns requested information to the audio playback apparatus 30. At time T37, if the audio playback apparatus 30 successfully receives the response from the server 10, the audio playback apparatus 30 determines that the server 10 has successfully Note that the process performed by the audio playback apparatus 30 at T32 to T37 corresponds to the process in steps S15 to S17 shown in FIG. 7.

In the above-described process of determining whether the server 10 has been successfully activated, a request for the device description may be issued, and the determination may be affirmatively made if the device description is successfully received. Alternatively, the determination may be affirmatively made if the response from the server 10 is received at time T35.

Before a WOL packet is transmitted, a server detection signal may be transmitted. If no response from the server 10 is received, the WOL packet may be transmitted in the above-described manner. Before the WOL packet or the server detection signal is transmitted, a ping command may be transmitted to the server 10 to detect whether the communication interface 17 of the server 10 is in operation. If the communication interface 17 is not in operation, it may be determined that it is impossible to receive contents from the server 10.

In the case where it is determined that the server 10 has been successfully activated, the audio playback apparatus 30 performs an action to request the server 10 to transmit the specified content data (this process corresponds to step S18 in FIG. 7). At time T38, if the server 10 receives the content transmission request, the server 10 starts transmission of the requested content data. The audio playback apparatus 30 sequentially receives the content data transmitted from the server 10 and stores the received content data in the audio buffer 331. At time T39, if the specified playback start time has been reached, playback of the received content data is started (this process corresponds to step S22 in FIG. 7).

In the audio playback apparatus 30, the waiting time Tmax may be set to be equal to or longer than a predicted time needed to perform the process from T31 to T39 in FIG. 8 to ensure that the playback of the specified content is started at the specified playback start time without fail. More specifically, the waiting time Tmax may be set to be equal to or greater than the sum of the time needed to activate the audio playback apparatus 30 and acquire the network address thereof, the time needed to activate the server 10 from which to receive the content, the time needed for the server 10 for make preparations for transmission of the content, and the time needed for the audio playback apparatus 30 to make preparations for playback of the content after the content transmission request is issued. In the case where the audio playback apparatus 30 is already in the active state, the waiting time Tmax does not need to include the time for activating the audio playback apparatus 30 and acquiring the address.

The waiting time Tmax may be determined on the basis of actual measurement performed at an arbitrary time or when the timer is set, and the determined waiting time Tmax may be stored in the timer setting storage unit 342. In this case, for example, a time equal to the measured waiting time Tmax plus a predetermined time $\{\alpha\}$ may be stored in the timer setting storage unit 342, and the process start time T31 may be set to T−(Tmax+$\{\alpha\}$) thereby further ensuring that the playback of the content is started at the specified playback start time.

The time actually elapsed from T31 to T39 may be measured each time the timer-controlled playback operation is performed, the waiting time Tmax may be updated depending on the measured value. More specifically, if the measured elapsed time from T31 to T39 is longer than the current waiting time Tmax stored in the timer setting storage unit 342, the measured time is employed as a new waiting time Tmax. Alternatively, values obtained in a predetermined number of latest measurements are retained as log data, and the waiting time Tmax may be updated in accordance with the average of the measured values.

In the embodiment described above, when the playback of the specified content cannot be started at the specified playback start time, the auxiliary content prepared in the apparatus is played. Alternatively, in such a situation, a content received from another server (for example, the server 20) may be played.

In this case, if the audio playback apparatus 30 detects a response returned from a server (for example, the server 20) other than the specified server in response to the server detection signal transmitted in step S15 in FIG. 7, the audio playback apparatus 30 issues a content transmission request to the server 20 in a parallel manner. In the case where the server 10 cannot complete preparations for the playback of the specified content by the specified playback start time, if the preparations for the playback of the content supplied from the server 20 has already been completed, the playback of the content supplied from the server 20 is started.

In this case, not only the waiting time for the playback of the content supplied from the server 10 but also the waiting time for the content supplied from the server 20 may be set, and the process start time (at which step S11 is started) may be determined on the basis of the above two waiting times. For example, the process start time is determined in accordance with the longer one of the two waiting times.

In the case where responses to the server detection signal returned from a plurality of servers other than the specified server are detected, a most reliable server such as one which turned out to be highly reliable in use in the past is selected, and preparations for playback of the content supplied from the selected server are made. Alternatively, information necessary to acquire the same content as that acquired latest may be stored for each server. When an auxiliary content is received from a server other than the specified server, the content received latest from this server may be specified as the auxiliary content. By selecting the auxiliary server or the auxiliary content in the above-described manner, it becomes possible to simplify the procedure of acquiring the auxiliary content. Besides, this reduces the probability that a content which may give a strange feeling to a user is selected as the auxiliary content.

In the case where an auxiliary content prepared in the apparatus or acquired from a server other than the specified server is played at the specified playback start time, the process of acquiring the content, originally specified to be played at the specified playback start time in the timer-controlled playback mode, from the specified server is not terminated but further continued so that when the preparation for playback of the originally specified content is completed, the playback of the auxiliary content is stopped, and playback of the originally specified content is started.

In this case, the time actually needed to complete the preparations for playback of the specified content is measured, and the waiting time Tmax stored in the timer setting storage unit 342 may be updated in accordance with the measured value. This increases the probability that playback of the specified content can be started at the specified playback start time without a delay in a next timer-controlled playback operation.

The server 10 may be configured to have an additional capability of providing waiting time information. This makes it possible to control the waiting time in a more reliable manner.

In this case, when conditions of the timer-controlled playback operation are set, the audio playback apparatus 30 acquires the server ID or the MAC address of the server 10 from which to receive the specified content, and the audio playback apparatus 30 accesses the server 10 in accordance with the acquired server ID or the MAC address to request the server 10 to provide the waiting time information.

If the server 10 having the capability of providing the waiting time information receives the request for the waiting time information from the audio playback apparatus 30, the server 10 makes preparations for transmission of the waiting time information. The waiting time information indicates the time needed for the server 10 to wake up from the sleep state and transmit a predetermined amount of data of the specified content. The waiting time information may be determined in advance and may be retained in the server 10. Alternatively, the waiting time information may be calculated on the basis of the log data when the request for the waiting time information is received. If the preparations for the transmission of the waiting time information are completed, the server 10 transmits the waiting time information to the audio playback apparatus 30 which is the requester of the waiting time information.

If the audio playback apparatus 30 receives the waiting time information, the audio playback apparatus 30 stores it in the timer setting storage unit 342.

In a case where a plurality of servers similar to the server 10 exist on the network, it is desirable to acquire the waiting time information from each server and stores the acquired waiting time information separately for each server.

Use of the waiting time information stored for each server makes it possible to access a server to receive a specified content at a correct time. This prevents the audio playback apparatus 30 from failing to complete the preparation for the playback of a content supplied from a server by the specified playback start time in the timer-controlled playback mode.

When the content being played back is switched from the auxiliary content to the originally specified content, the switching may be performed in a cross-fading manner so that the sound volume of the auxiliary content is gradually reduced while gradually increasing the sound volume of the specified content.

In a case where a playback stop command is issued by a user in the middle of the playback of the auxiliary content, the preparation for playback of the originally specified content is also stopped. In this case, if reception of the originally specified content has already started, an action is taken to send a command to the server to stop the transmission of the content.

Second Embodiment

Figure 9:
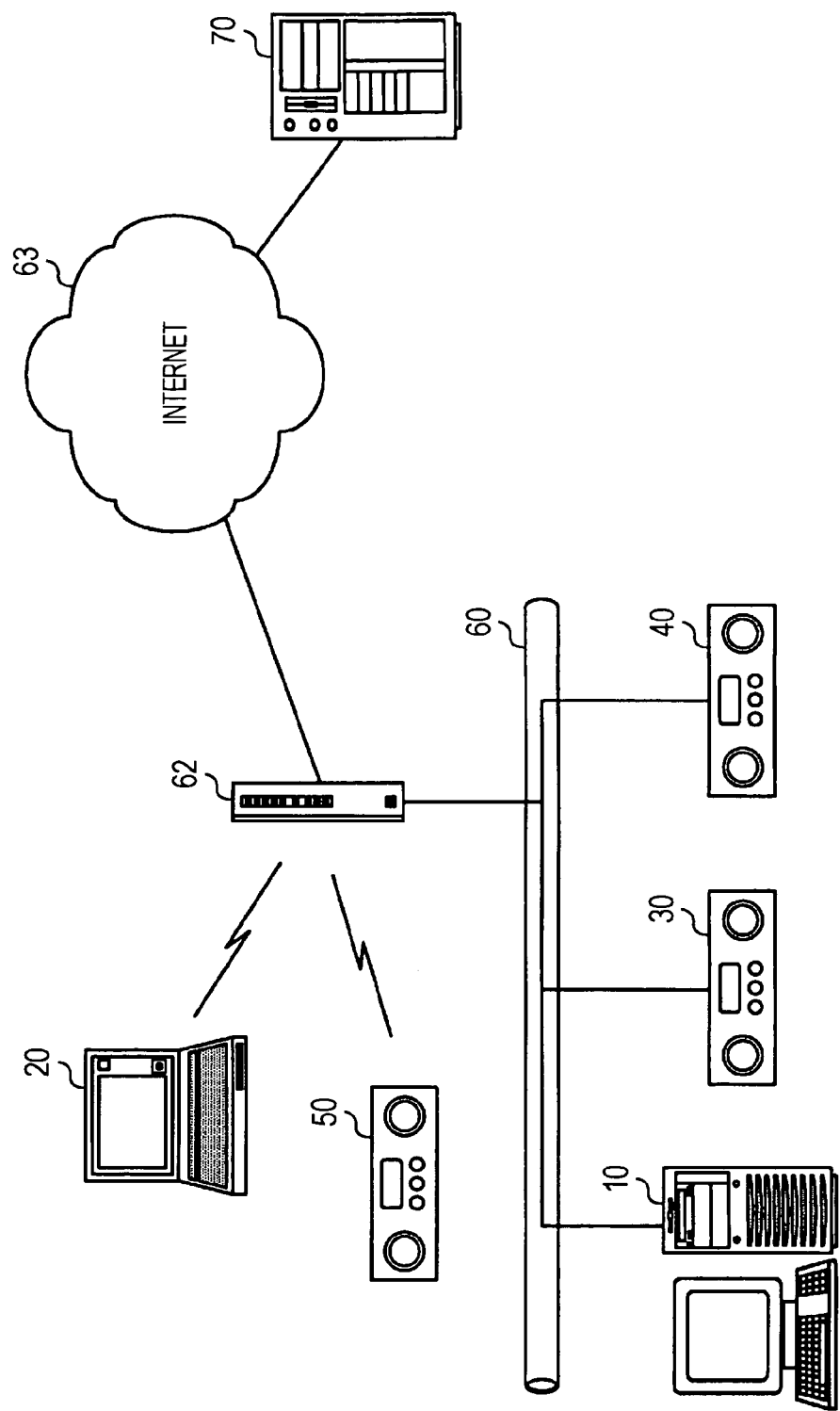
FIG. 9 illustrates an example of a configuration of a home network system according to an embodiment of the present invention.

FIG. 9 illustrates an example of a configuration of a home network system according to another embodiment of the present invention. In FIG. 9, similar parts to those in FIG. 1 are denoted by similar reference numerals.

In the example shown in FIG. 9, as with the example shown in FIG. 1, the network system includes servers 10 and 20 and audio playback apparatuses 30, 40, and 50. A broadband router 62 has a capability of functioning as an access point similar to the access point 61 shown in FIG. 1, and serves to connect the home network system to a wide area network (the Internet 63). In practice, the broadband router 62 connects the home network system to the Internet 63 via an Internet provider (not shown).

A server 70 is connected to the Internet 63. The audio playback apparatuses 30, 40, and 50 are capable of playing back not only contents supplied from the server 10 or 20 but also contents supplied from the server 70. The server 70 functions as a Web server adapted to provide contents in the form of streams using HTTP.

The audio playback apparatuses 30, 40, and 50 have the capability of playing contents supplied from the server 70 in the timer-controlled playback mode. In the time-controlled playback operation, as in the previous embodiment described above, when a content supplied from the server 70 cannot be played, an auxiliary content prepared in the apparatus or other contents are played.

In the following explanation, by way of example, it is assumed that the audio playback apparatus of interest is the audio playback apparatus 30, although other audio playback apparatuses can also operation in a similar manner. In the present embodiment, when the audio playback apparatus 30 plays a content supplied from the server 70 in the timer-controlled playback mode, the audio playback apparatus 30 performs a process similar to that shown in FIG. 7 except that the process does not include steps S15 to S17. That is, after the audio playback apparatus 30 activates itself and acquires the network address thereof, the audio playback apparatus 30 accesses the server 70 in accordance with the URL stored in the timer setting storage unit 342. In a case where the access to the server 70 is not achieved in a predetermined period of time or in a case where after the audio playback apparatus 30 successfully accesses the server 70, the audio playback apparatus 30 fails to store a predetermined amount of content data in the audio buffer 331 by the specified playback start time, or in a case where the transmission rate of the content data is lower than a predetermined threshold, it is determined that it is impossible to play the specified content, and the auxiliary content is played. Thus, it is ensured that some sound is output at the specified playback start time.

The auxiliary content is not limited to the content prepared in the audio playback apparatus, but other contents such as that transmitted from the server 10 or 20 on the home network may be employed as the auxiliary content. In the latter case, in parallel to the process of accessing the server 70, the audio playback apparatus 30 makes preparations for playback of a content supplied from the server 10 or 20.

Third Embodiment

FIG. 10 is a block diagram illustrating an example of a hardware configuration of an audio playback apparatus according to an embodiment of the present invention. In FIG. 10, similar parts to those in FIG. 5 are denoted by similar reference numerals.

In the example shown in FIG. 10, the audio playback apparatus 30a includes, in addition to parts shown in FIG. 5, an optical disk drive 45, a radio tuner 46, and a selector 47. The optical disk drive 45 is adapted to read audio data from an optical disk mounted on the optical disk drive 45. The radio tuner 46 is adapted to receive a broadcast radio wave and demodulate the received radio wave into an audio signal. The audio signal is finally output in the form of digital data. The selector 47 operates under the control of the CPU 31 to select one of audio data output from the communication interface 17 37, the optical disk drive 45, and the radio tuner 46 and supply the selected audio data to the audio decoder 38.

The audio playback apparatus 30a configured in the above-described manner is capable of selectably playing audio data received from the server 10 or 20 via the LAN 60, audio data recorded on the optical disk, or audio data received via the radio tuner 46. The audio data supplied from these units can be played in the timer-controlled playback mode.

In the case where audio data recorded on the optical disk is played back in the timer-controlled playback mode, the recording surface of the disk is illuminated with laser light emitted from an optical pickup a predetermined time before the specified playback start time, and a playback signal is detected. On the basis of a detection result, a determination is made as to whether there is an optical disk mounted on the optical disk drive 45. If no optical disk is mounted, the auxiliary content is played back.

In the case where the timer-controlled playback is performed using audio data received by the radio tuner 46, reception and demodulation of a radio wave with a specified frequency are started a predetermined time before the specified playback start time. The strength of the received radio wave or the level of the demodulated audio signal is detected. If only a carrier wave is detected and no modulated signal is detected, or if the level of the audio signal is very low, it is determined that playback is impossible, and the auxiliary content is played back. Thus, it is ensured that some sound is output at the specified playback start time.

Instead of the content recorded on the optical disk, contents recorded on other types of removable recording medium may be used in the timer-controlled playback operation. The auxiliary content is not limited to the content stored in advance in the apparatus, but other contents such as a content received from a server on the network, a content recorded on a removable recording medium, or a content received by the radio tuner 46 may be used.

In the embodiments described above, it is assumed that data of an audio content is played back in the timer-controlled playback mode. Alternatively, data of other types of contents such as a video content may be played back. In the case where the timer-controlled playback operation is used as an alarm, a content including a sound/voice is more desirable.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus, comprising:
first content input means via which to input first content from a first apparatus, the first content representing first content to be played back;
requesting means for requesting the first apparatus to input the first content to be played back;
second content input means via which to input second content;
clock means for measuring time;
specified playback start time storage means for storing data indicating a specified playback start time at which to start playback of the first content to be played back; and
control means for controlling a playback operation such that if it is determined that a first amount of data of the first content to be played back which is received from the first apparatus is less than a threshold value prior to the specified playback start time, the threshold value being less than an entire amount of the data of the first content, the control means controls the playback operation to start playing back the second content at the specified playback start time.

2. The playback apparatus according to claim 1, wherein the first content input means is connected to a network access means; and
the first content input means is communicative with a network via the network access means, the network being connected to the first apparatus.

3. The playback apparatus according to claim 2, further comprising a content playback means for playing back the second content,
wherein the second content is input via the second content input means.

4. The playback apparatus according to claim 3, wherein the second content is stored in nonvolatile storage means.

5. The playback apparatus according to claim 1, wherein the control means is configured such that, if the time measured by the clock means indicates that a predetermined time before the specified playback start time has been reached, the control means controls the requesting means to request the first apparatus to input the first content.

6. The playback apparatus according to claim 5, further comprising time storage means for storing data indicating the predetermined time before the specified playback start time and at which to request the first apparatus to input the first content to be played back.

7. The playback apparatus according to claim 5, wherein the predetermined time is set based on a start-up time needed to start up the playback of the first content.

8. The playback apparatus according to claim 6, further comprising time information receiving means for receiving, from the first apparatus, data indicating the predetermined time.

9. A playback apparatus, comprising:
first content accepting means for accepting input of primary content to be played back;
second content accepting means for accepting input of an auxiliary content;
clock means for measuring time to detect arrival of a specified playback start time at which to start playback of the primary content to be played back in a timer-controlled playback mode; and
playback control means for controlling a playback operation such that when the time measured by the clock means indicates arrival of a playback preparation start time a predetermined time before the specified playback start time, a playback preparation process is started for making preparation for playback, in the timer-controlled playback mode, of the primary content to be played back, and, if a first amount of data of the primary content to be played back is less than a first threshold value prior to the specified playback start time, the first threshold value being less than an entire amount of the data of the primary content, the playback control means starts playback of the auxiliary content at the specified playback start time,
wherein the first content accepting means is adapted to receive the primary content to be played back from a first server on a network.

10. The playback apparatus according to claim 9, wherein the second content accepting means is adapted to read the auxiliary content stored in a nonvolatile storage medium disposed in the playback apparatus.

11. The playback apparatus according to claim 9, wherein
the playback preparation process includes starting up the first server, and
if the playback control means does not detect that the first server has successfully started up prior to the specified playback start time, the playback control means starts the playback of the auxiliary content at the specified playback start time.

12. The playback apparatus according to claim 9, wherein the playback control means starts the playback of the auxiliary content also in a case where transmission of the primary content from the first server is at a transmission rate lower than a second threshold value.

13. The playback apparatus according to claim 9, wherein
the playback preparation process includes a process of acquiring a network address of the first server on the network, and
if the network address is not acquired prior to the specified playback start time, the playback control means starts the playback of the auxiliary content.

14. The playback apparatus according to claim 9, wherein
the second content accepting means is adapted to receive the auxiliary content from a second server connected to the network, wherein the second server is different than the first server, and
the playback control means controls the playback operation by detecting the second server, and, if the second server is detected, receiving the auxiliary content from the second server for preparation for playback of the auxiliary content in parallel to the playback preparation process for preparation for the playback of the primary content to be played back, and if the first amount of data of the primary content to be played back is less than the first threshold value prior to the specified playback start time, the playback control means starts the playback of the auxiliary content received from the second server.

15. The playback apparatus according to claim 9, further comprising nonvolatile time information storage means for storing the specified playback start time and a playback preparation duration starting at the playback preparation start time and ending at the specified playback start time, and
wherein the playback control means determines the playback preparation start time based on information stored in the nonvolatile time information storage means.

16. The playback apparatus according to claim 15, further comprising:

time measurement means for measuring a time duration needed to perform the playback preparation process for preparation for the playback of the primary content to be played back, and preparation time setting means for setting the playback preparation duration in the nonvolatile time information storage means based on the time duration measured by the time measurement means.

17. The playback apparatus according to claim 16, wherein the preparation time setting means updates the playback preparation duration stored in the nonvolatile time information storage means based on a log data indicating the time duration measured by the time measurement means.

18. The playback apparatus according to claim 9, wherein the playback control means controls the playback operation such that in a case where playback of the auxiliary content is started at the specified playback start time, the playback control means continues the playback preparation process for preparation for the playback of the primary content to be played back, and, if the playback preparation process is completed, the playback control means stops the playback of the auxiliary content and starts the playback of the primary content to be played back.

19. The playback apparatus according to claim 9, wherein the first content accepting means reads the primary content stored in a removable storage medium.

20. The playback apparatus according to claim 19, wherein if the playback control means determines that the removable storage medium is not connected to the playback apparatus, the playback control means starts playback of the auxiliary content.

21. The playback apparatus according to claim 9, wherein the first content accepting means is a radio tuner.

22. The playback apparatus according to claim 21, wherein when an audio signal received and demodulated by the radio tuner has a signal level lower than or equal to a predetermined value, the playback control means starts the playback of the auxiliary content.

23. The playback apparatus according to claim 9, wherein the primary content to be played back in the timer-controlled playback mode and the auxiliary content include audio data to be output when played back.

24. A method, comprising the steps of:

by clock means, measuring time to detect arrival of a specified playback start time at which to start playback of a primary content, by playback control means, when the time measured by the clock means indicates arrival of a playback preparation start time a predetermined time before the specified playback start time, starting a playback preparation process for making preparation for playback, in a timer-controlled playback mode, of the primary content accepted via first content accepting means, and if a first amount of data of the primary content to be played back which is received prior to the specified playback start time is less than a threshold, the threshold being less than an entire amount of the data of the primary content, starting playback of an auxiliary content at the specified playback start time, wherein the auxiliary content is accepted via second content accepting means, wherein the first content accepting means is adapted to accept the primary content from a first server on a network.

25. A playback apparatus, comprising:

a first content input interface via which to input first content from a first apparatus, the first content representing first content to be played back;

a requesting controller adapted to request the first apparatus to input the first content to be played back;

a second content input interface via which to input a second content;

a clock adapted to measure time;

a specified playback start time storage adapted to store data indicating a specified playback start time at which to start playback of the first content to be played back; and a playback controller adapted to control a playback operation such that if the time measured by the clock indicates that a predetermined time before the specified playback start time has been reached, the playback controller controls the requesting controller to request the first apparatus to input the first content to be played back, and, if a transmission of the first content to be played back from the first apparatus is at a transmission rate lower than a threshold value prior to the specified playback start time, the playback controller controls the playback operation to start playing back the second content at the specified playback start time.

26. A playback apparatus, comprising:

a first content accepting interface adapted to accept input of primary content, the primary content representing primary content to be played back;

a second content accepting interface adapted to accept input of an auxiliary content;

a clock adapted to measure time to detect arrival of a specified playback start time at which to start playback of the primary content to be played back in a timer-controlled playback mode; and a playback controller adapted to control a playback operation such that when the time measured by the clock indicates arrival of a playback preparation start time a predetermined time before the specified playback start time, a playback preparation process is started for making preparation for playback, in the timer-controlled playback mode, of the primary content to be played back, and, if the playback preparation process is not successfully completed prior to the specified playback start time, playback of the auxiliary content is started at the specified playback start time, wherein the playback preparation start time is set based on a data size of the primary content to be played back.

* * * * *